US011187142B2

(12) United States Patent
Schock et al.

(10) Patent No.: US 11,187,142 B2
(45) Date of Patent: Nov. 30, 2021

(54) DIESEL ENGINE WITH TURBULENT JET IGNITION

(71) Applicant: Board of Trustees of Michigan State University, East Lansing, MI (US)

(72) Inventors: Harold Schock, Okemos, MI (US); Guoming Zhu, Novi, MI (US)

(73) Assignee: Board of Trustees of Michigan State University, East Lansing, MI (US)

(*) Notice: Subject to any disclaimer, the term of this patent is extended or adjusted under 35 U.S.C. 154(b) by 10 days.

(21) Appl. No.: 16/634,733

(22) PCT Filed: Jul. 26, 2018

(86) PCT No.: PCT/US2018/043879
§ 371 (c)(1),
(2) Date: Jan. 28, 2020

(87) PCT Pub. No.: WO2019/027800
PCT Pub. Date: Feb. 7, 2019

(65) Prior Publication Data
US 2020/0200068 A1 Jun. 25, 2020

Related U.S. Application Data

(60) Provisional application No. 62/539,678, filed on Aug. 1, 2017.

(51) Int. Cl.
*F02B 19/18* (2006.01)
*F02M 26/06* (2016.01)
(Continued)

(52) U.S. Cl.
CPC .............. *F02B 19/18* (2013.01); *F01L 1/047* (2013.01); *F02B 19/12* (2013.01); *F02B 25/00* (2013.01);
(Continued)

(58) Field of Classification Search
CPC .......... F02B 19/18; F02B 19/12; F02B 25/00; F02B 37/00; F02B 43/12; F02B 21/02;
(Continued)

(56) References Cited

U.S. PATENT DOCUMENTS 4,300,497 A 11/1981 Webber
4,332,224 A 6/1982 Latsch et al.
(Continued)

FOREIGN PATENT DOCUMENTS

CN 102333944 A 1/2012
CN 106014694 A 10/2016
(Continued)

OTHER PUBLICATIONS

Attard, William P., et al.: "Spark Ignition and Pre-Chamber Turbulent Jet Ignition Combustion Visualization," SAE International, 2012-01-0823, Published Apr. 16, 2012, 16 pages.
(Continued)

*Primary Examiner* — Xiao En Mo
(74) *Attorney, Agent, or Firm* — Harness, Dickey & Pierce PLC

(57) ABSTRACT

A diesel engine employs a turbulent jet ignition system and method. In another aspect, diesel fuel and air are premixed prior to introduction of the mixture into a main engine combustion chamber. A further aspect employs a turbocharger compressor to boost air pressure into a main piston combustion chamber and/or an ignition pre-chamber for missing with a heavy fuel, such as diesel.

27 Claims, 4 Drawing Sheets

(51) Int. Cl.
*F02M 26/13* (2016.01)
*F02M 26/20* (2016.01)
*F02M 26/23* (2016.01)
*F02M 26/53* (2016.01)
*F01L 1/047* (2006.01)
*F02B 19/12* (2006.01)
*F02B 25/00* (2006.01)
*F02B 37/00* (2006.01)
*F02B 43/12* (2006.01)
*F02D 41/00* (2006.01)
*F02D 41/38* (2006.01)
*F02P 5/04* (2006.01)

(52) U.S. Cl.
CPC .............. *F02B 37/00* (2013.01); *F02B 43/12* (2013.01); *F02D 41/0007* (2013.01); *F02D 41/0065* (2013.01); *F02D 41/38* (2013.01); *F02M 26/06* (2016.02); *F02M 26/13* (2016.02); *F02M 26/20* (2016.02); *F02M 26/23* (2016.02); *F02M 26/53* (2016.02); *F02P 5/04* (2013.01); *F02D 2200/024* (2013.01); *F02D 2200/0614* (2013.01)

(58) Field of Classification Search
CPC ......... F02B 19/14; F02B 23/04; F02M 26/06; F02M 26/13; F02M 26/20; F02M 26/23; F02M 26/53; F01L 1/047; F02D 41/0007; F02D 41/0065; F02D 41/38; F02D 2200/024; F02D 2200/0614; F02P 5/04
See application file for complete search history.

(56) References Cited

U.S. PATENT DOCUMENTS

| | | |
|---|---|---|
| 5,036,669 A | 8/1991 | Earleson et al. |
| 5,454,356 A | 10/1995 | Kawamura |
| 5,560,326 A | 10/1996 | Merritt |
| 7,100,567 B1 | 9/2006 | Bailey et al. |
| 7,398,743 B2 | 7/2008 | Fiveland |
| 8,925,518 B1 | 1/2015 | Riley et al. |
| 9,091,222 B2 | 7/2015 | Furukawa |
| 9,376,955 B2 | 6/2016 | Reitz et al. |
| 9,653,886 B2 | 5/2017 | Chiera et al. |
| 9,840,963 B2 | 12/2017 | Chiera et al. |
| 9,856,848 B2 | 1/2018 | Chiera et al. |
| 9,890,689 B2 | 2/2018 | Hampson et al. |
| 9,893,497 B2 | 2/2018 | Chiera et al. |
| 9,920,714 B2 | 3/2018 | Ginter et al. |
| 10,054,102 B2 | 8/2018 | Chiera et al. |
| 10,161,296 B2 | 12/2018 | Schock et al. |
| 10,208,651 B2 | 2/2019 | Tozzi et al. |
| 10,287,969 B2 | 5/2019 | Boyde et al. |
| 10,337,397 B2 | 7/2019 | Shelby et al. |
| 2008/0047511 A1 | 2/2008 | Taye et al. |
| 2009/0132153 A1 | 5/2009 | Shutty et al. |
| 2011/0308495 A1 | 12/2011 | Furukawa |
| 2011/0315102 A1 | 12/2011 | David et al. |
| 2012/0118262 A1* | 5/2012 | Johnson ................. F02B 19/00 123/260 |
| 2015/0059456 A1 | 3/2015 | Niessner et al. |
| 2015/0233280 A1 | 8/2015 | Ernst et al. |
| 2016/0230645 A1 | 8/2016 | Schock et al. |
| 2017/0114738 A1* | 4/2017 | Hoard ................. F02M 25/028 |
| 2017/0191406 A1 | 7/2017 | Rabhi |
| 2017/0349164 A1* | 12/2017 | Miller ................. B60W 10/08 |
| 2018/0080397 A1* | 3/2018 | Choi ................. F02D 41/0005 |
| 2018/0119625 A1* | 5/2018 | Dane ................. F02B 37/04 |
| 2018/0363539 A1* | 12/2018 | Shelby ................. F02B 19/108 |

FOREIGN PATENT DOCUMENTS

| | | |
|---|---|---|
| DE | 102005039713 A1 | 2/2007 |
| JP | 2002266644 A | 9/2002 |
| WO | WO-2015138987 A1 | 9/2015 |

OTHER PUBLICATIONS

"Delphi Variable Cam Phaser," Powertrain Systems, Delphi, Published Jul. 26, 2017, pp. 1-3.
"Exhaust Gas Recirculation," Wikipedia, https://en.wikipedia.org/wiki/Exhaust_gas_recirculation, printed Jul. 26. 2017, four pages.
Toulson, Elisa, et al.: "Advanced Combustion Engines / 2015 Annual Report," Vehicle Technologies Office, Michigan State University, U.S. Department of Energy, 2015, pp. 162-166.
Toulson, Elisa, et al.: Visualization of Propane and Natural Gas Spark Ignition and Turbulent Jet Ignition Combustion, SAE International, 2012-32-0002, Published Oct. 23, 2012, pp. 1821-1835.

* cited by examiner

DIESEL ENGINE WITH TURBULENT JET IGNITION

CROSS-REFERENCE TO RELATED APPLICATIONS

This application is a 371 U.S. National Phase of International Application No. PCT/US2018/043879, filed on Jul. 26, 2018, which claims priority to U.S. Provisional Patent Application Ser. No. 62/539,678, filed on Aug. 1, 2017. The entire disclosures of the above applications are incorporated herein by reference.

BACKGROUND AND SUMMARY

The present application generally pertains to vehicular engines and more particularly to a diesel engine with turbulent jet ignition.

Diesel engines have been commonly used for automotive wheeled vehicles, such as trucks for tractor-trailers, heavy construction vehicles for earth moving uses, passenger automotive vehicles, and armored military vehicles such as cannon-mounted tanks and armored personnel carriers. Recently, they have been employed in light aircraft. Such conventional diesel engines are typically internal combustion engines within which ignition of diesel fuel in the main combustion chamber is caused by high air temperatures when greatly compressed therein, which is known as compression-ignition. Typically, such traditional diesel engines do not require spark or glow plug ignition, especially after the engine has warmed up. Exemplary traditional diesel engine constructions are disclosed in U.S. Pat. No. 5,560,326 entitled "Internal Combustion Engine" which issued to Merritt on Oct. 1, 1996, and U.S. Pat. No. 9,376,955 entitled "Engine Combustion Control Via Fuel Reactivity Stratification" which issued to Reitz et al. on Jun. 28, 2016, both of which are incorporated by reference herein.

Conventional diesel engines typically rotate their output crank shaft at or less than 3,600 rpm. Known diesel engines rely on diffusion mixing, where the fuel and air are not premixed, however, the mixing in the piston combustion chamber takes time, which in turn, reduces the output rpm range. In contrast, premixing of the diesel fuel and air is not commonly desired in diesel engines since it would auto-ignite before the piston fully rises or retracts due to the very high compressions involved, which would be harmful to the engine components and decrease performance. Moreover, conventional diesel engines often suffer from too rich a mixture which disadvantageously causes undesired particulates in the exhaust.

Another conceptual diesel engine is disclosed in U.S. Pat. No. 4,300,497 entitled "Prevaporizing Diesel Precombustion Chamber" which issued to Webber on Nov. 17, 1981, and is incorporated by reference herein. It is noteworthy that an isolation valve closes an opening between a precombustion chamber and piston cylinder. Furthermore, the only air passage to the precombustion chamber is from the piston cylinder, which may lead to undesired auto-ignition and contamination issues, and is difficult to automatically control and vary based on real-time engine performance and desired characteristics.

In accordance with the present invention, a diesel engine employs a turbulent jet ignition system and method. In another aspect, diesel fuel and air are premixed prior to introduction of the mixture into a main engine combustion chamber. A further aspect employs a turbocharger compressor to boost air pressure into a main piston combustion chamber and/or an ignition pre-chamber for mixing with a heavy fuel, such as diesel fuel. Another aspect employs a turbulent jet ignition pre-chamber for diesel fuel to serve as a supplemental engine to drive an armored military vehicle. Still another aspect of a diesel engine splits hydrogen from a diesel or other hydrocarbon fuel supply whereafter the hydrogen fuel is mixed with air in a pre-chamber within which ignition in the pre-chamber subsequently ignites fuel in a primary piston combustion chamber.

Methods of operating any and all of the preceding aspects are also provided. Moreover, methods of controlling a rate of pre-chamber combustion, controlling air flow, controlling spark timing, controlling diesel fuel flow, controlling main chamber combustion timing, controlling valve timing using a cam phaser, controlling a temperature of exhaust gas recirculation, controlling an amount of exhaust gas recirculation, boosting air pressure, optimizing diesel fuel combustion, controlling hydrocarbon and/or hydrogen splitting of diesel fuel, and/or controlling a mixing ratio of air and fuel in the pre-chamber, are additionally provided.

The present diesel engine with turbulent jet ignition is advantageous over traditional devices. For example, the present system and method advantageously achieve significantly higher rpm speeds, for example at least 6,000 rpm, as compared to the maximum traditional 3,600 rpm speeds. The faster and earlier fuel and air mixing and burning of the present system and method improve diesel engine efficiency, are expected to significantly reduce exhaust particle levels, for example NOx, and allow for the higher rpm and improved performance. The present system and method also increase power density for the diesel engine. Furthermore, the present system and method advantageously reduce or eliminate auto-ignition during piston compression by controlling the amount and temperature of exhaust gas recirculation or residual gases, and/or turbocharged boosting of intake air to the main and pre-chamber to maintain traditional and higher levels of brake mean effective pressure. It is also envisioned that a lower cost exhaust after-treatment system and a lower pressure diesel fuel pump (e.g., less than 1000 bar) may be employed with the present system and method. Moreover, it is expected that the output power of the present system and method will be increased by at least 50 percent as compared to conventional diesel engines. It is additionally envisioned that the present engine will operate at cooler combustion temperatures (e.g., less than 1,500° C.), thereby producing lower NOx emissions. Additional advantages and features of the present application will become apparent from the following description, attached drawings and appended claims.

DETAILED DESCRIPTION

Figure 1:
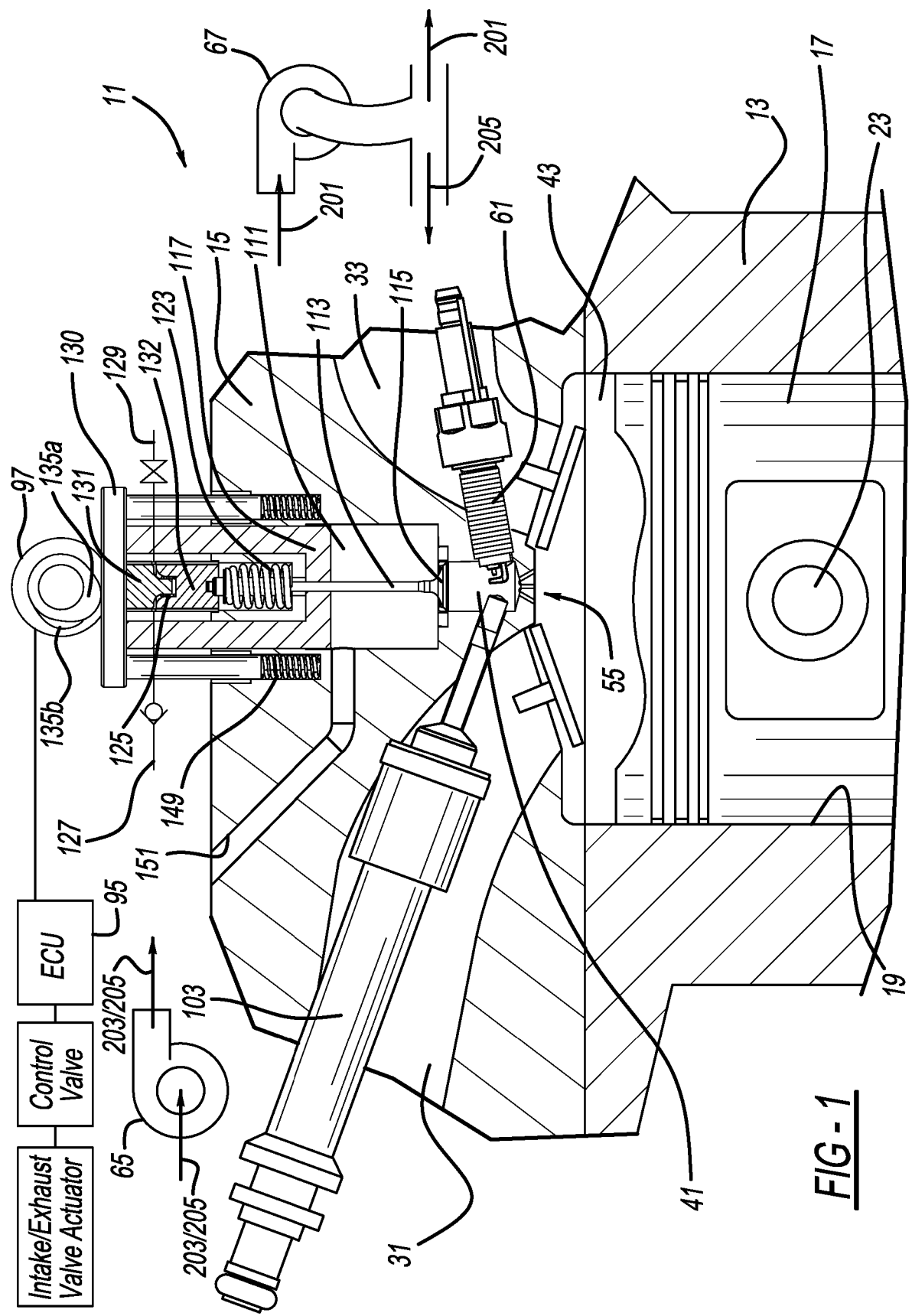
FIG. 1 is a cross-sectional view showing a diesel engine employing turbulent jet ignition of the present system and method.
Figure 2:
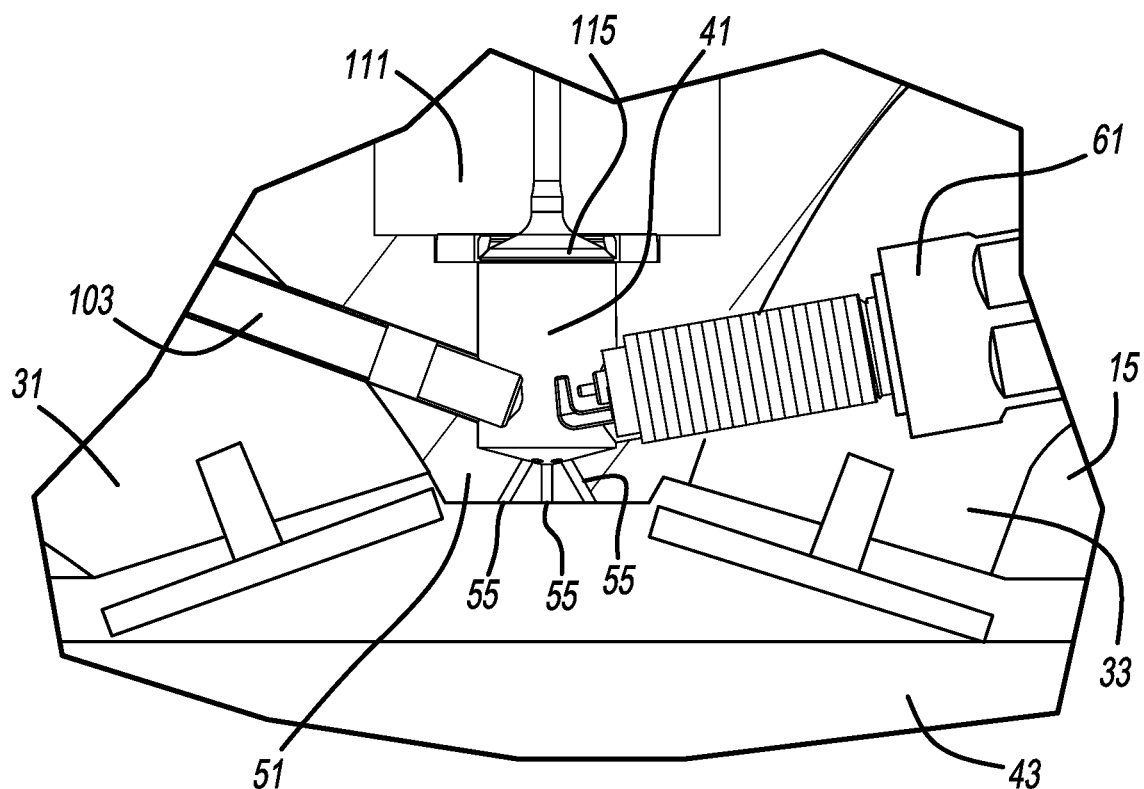
FIG. 2 is an enlarged cross-sectional view, similar to that of FIG. 1, showing the present diesel engine with turbulent jet ignition.

Referring to FIGS. 1 and 2, an internal combustion diesel engine 11 of an automotive vehicle, such as an armored military vehicle, heavy construction equipment, truck for a tractor-trailer, light aircraft, or automotive passenger vehicle, includes an engine block 13 and a cylinder head 15 mounted thereto. A main driving piston 17 operably advances and retracts within a cylinder cavity 19 in order to drive a connecting rod spanning between a pin 23 of piston 17 and a crank shaft. Furthermore, cylinder head 15 includes an intake manifold 31, an exhaust manifold 33, a diesel fuel injector 103 and a turbulent jet ignition prechamber 41. A main combustion chamber 43 is located above main piston 17 partially within cylinder cavity 19 and cylinder head 15, directly below turbulent jet ignition prechamber 41.

Referring now to FIG. 2, turbulent jet ignition prechamber 41 includes a cup-shaped housing 51, secured to cylinder head 15, which internally defines the pre-chamber cavity therein. At least one and more preferably three to ten apertures 55 are always open and connect pre-chamber 41 to main combustion chamber 43. Each aperture is approximately 1 mm in diameter, however, it may have non-circular shapes with areas as large as ten times the area of a 1 mm diameter orifice. Optionally, an ignitor 61, such as a spark plug, glow plug or the like, has an end located within pre-chamber 41 for providing a spark or other heat ignition source for a diesel fuel-air mixture or charge within pre-chamber 41.

Figure 3:
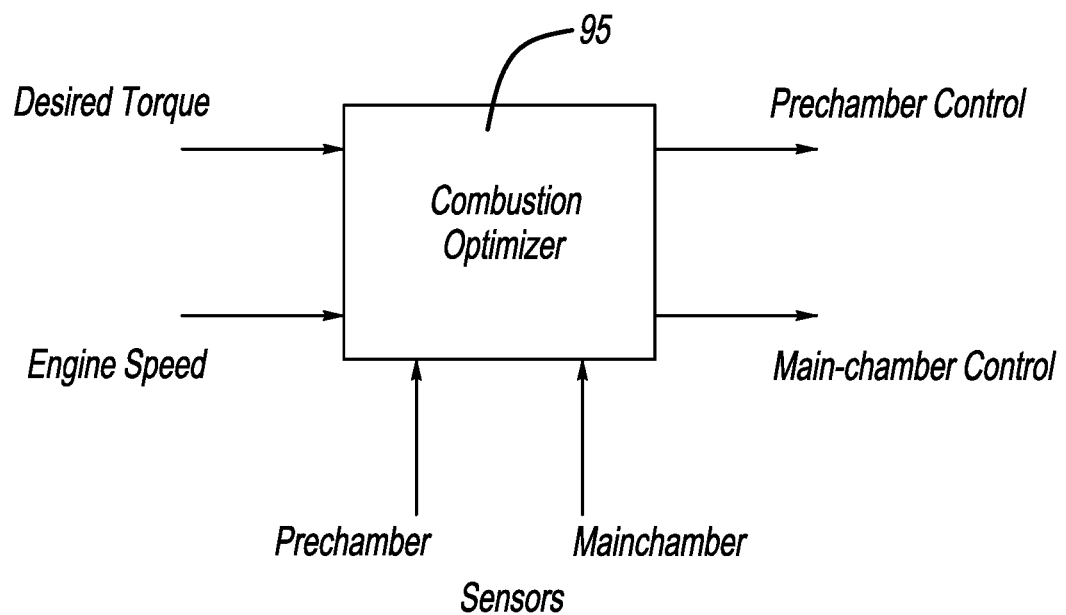
FIG. 3 is an electrical block diagram showing the present diesel engine with turbulent jet ignition.

Reference should now be made to FIGS. 1 and 3. Optionally, a first pressure transducer is partially located within or is otherwise accessible to pre-chamber 41 for sensing internal pressure therein and a second pressure transducer is partially located within or is otherwise accessible to main combustion chamber 43 for sensing an internal pressure therein. The transducers, if employed, are electrically connected to an electronic controller 95, such as a programmable electronic engine controller ("ECU") having a microprocessor, and non-transient computer ROM or RAM memory, capable of storing and running software including various programmed instructions.

Controller 95 has programmed instructions automatically controlling pressure within turbulent jet ignition pre-chamber 41 by controlling energization or opening of a turbocharger and/or an exhaust recirculation gas valve. Furthermore, controller has programmed instructions which cause ignitor 61 to create a spark for igniting the fuel-air charge in pressurized pre-chamber 41. Moreover, controller 95 has programmed instructions receiving signals indicative of the sensed pressure in pre-chamber 41 via the first transducer and main combustion chamber 43 via the second transducer. The controller thereafter automatically adjusts the pressure in pre-chamber 41, as will be discussed in greater detail hereinafter. Moreover, the controller has additional programming instructions causing a diesel fuel-air charge to be emitted into the pre-chamber. The controller will automatically calculate and vary pre-chamber pressure, fuel quantity and ignition timing based on the sensed pressure signals and cam position sensors 97, but also at least partly based on primary chamber fueling signals, engine temperature, air temperature and the like. The controller will thereafter compare these input signals to desired threshold valves and calculate desired output signals to operate one or more control valves associated with cam phasers and/or intake/exhaust valve actuators, turbocharger boost demand and primary chamber fueling. Exemplary cam phasers are disclosed in U.S. Patent Publication Nos. 2011/0315102 entitled "Harmonic Drive Camshaft Phaser and Method for Using" which published to David et al. on Dec. 29, 2011, and 2008/0047511 entitled "Harmonic Drive Camshaft Phaser" which published to Taye et al. on Feb. 28, 2008; both of which are incorporated by reference herein.

A charge of an oxidizer, such as air, in the engine main chamber is regulated using the turbocharger compressor and intake valve timing. The diesel fuel is also injected into the main combustion chamber 43 either through port fuel injection or direct injection. No spark plug is required for main combustion chamber since the diesel fuel-air mixture in main combustion chamber 43 is ignited by the previously ignited diesel fuel-air charge pushed through apertures 55 from the higher pressure pre-chamber 41.

It is noteworthy that the pre-chamber is preferably of a constant volume, and not functionally changed by supplemental piston movement or the like. Furthermore, in one exemplary construction a longitudinal centerline of pre-chamber 41 and a centerline of a central aperture exiting the pre-chamber are coaxially aligned with the centerline of main driving piston 17, which linearly advances and retracts towards and away from the pre-chamber in this longitudinal direction. This advantageously allows ejection of the ignition jet in a uniform manner from the pre-chamber such that ignition in the main piston chamber is uniformly applied upon the piston head surface. But other exemplary constructions may not require such centerline alignment, for packaging reasons.

The diesel fuel and air stoichiometry is electronically controlled and mixing takes place in pre-chamber 41. This system and method will allow the software instructions of the programmable controller to control the amount of diesel fuel, fresh air and exhaust gas recirculation ("EGR") in the pre-chamber from the previous combustion cycle. High pressure diesel fuel and air are separately admitted into the pre-chamber and thereafter mixed in the pre-chamber. Thereafter, the diesel fuel-air mixture in the pre-chamber is sparked by the ignitor to create a turbulent reacting jet which will ignite a global diesel fuel-air ratio in the main piston chamber.

As shown in FIGS. 1 and 2, fuel injector 103 directs diesel fuel toward an air shear stream from an in-line air pump mechanism 111, but which are not premixed prior to pre-chamber 41. The purpose is to create a near homogeneous diesel fuel-air mixture in the pre-chamber, providing high levels of turbulence for good mixing and an energy dense, fresh air charge to purge the products of combustion in the pre-chamber from the previous cycle, whether they were present from combustion in the pre-chamber or were driven into the pre-chamber from high pressure gas in a main piston cylinder chamber 43.

A purge pump 111 has a cylindrical housing and is coaxially connected to a top of pre-chamber 41 via a valve controlled air inlet port. An elongated valve stem 113 is coaxially aligned with and linearly moveable along a centerline of purge pump 111 and pre-chamber 41, such that a laterally enlarged and tapered plug or head 115 attached to stem 113 selectively opens and closes the air inlet port. Stem 113 and head 115 act as a controllable poppet valve activated by a cam 135a. A supplemental piston head 117 is slidable up and down relative to a middle section of stem 113, which extends therethrough, for linear movement therewith inside purge pump 111. Compression springs 149 upwardly bias the supplemental piston assembly to the retracted position.

An upper end of stem 113 is attached to a lower plunger half 132. A compression spring 123 biases valve head 115 toward a closed position blocking air from flowing from purge pump 111 to pre-chamber 41. An oil fluid aperture 125 is connected to an engine oil inflow line 127 and ball-check valve and an engine oil outflow line 129 and valve. Thus, the oil flows through passage 125 between an upper plunger half 131 and lower plunger half 132 selectively applying pressure thereagainst in a hydraulic tappet manner to move valve 115 in a variable manner controlled by the programmable engine controller 95.

A follower surface is at an exposed distal end of upper plunger half 131. An offset cam lobe surface 135*a*, rotating about a cam shaft (driven by driving the crank shaft), intermittently pushes against then releases the plunger surface, which causes linear advancing of plunger halves 131 and 132. This, in turn, opens and closes valve head 115 of purge pump 111 which provides variable air valve timing through a lost motion-type of arrangement. Furthermore, the air valve is quickly released near TDC if cam timing is insufficiently rapid. Meanwhile, when cam surface 135*b* is rotated to contact against plate 130, plate 130 and supplemental piston 117 are advanced. This compresses the air within purge pump so the fresh air can be injected through the open valve port into the pre-chamber 41. The offset two cam lobe example shown is advantageous for independent control of the valve and purge pump piston. The cam-driven approach also advantageously requires minimal energy consumption to drive the purge pump and is very durable. Additional or alternative mechanical valve and supplemental piston actuation may be employed, such as with linkages, levers, rods and/or cams. Other purge pump configurations, such as a remotely driven compressor, are also possible.

Pressurized fresh air enters purge pump 111 via inlet conduit 151. It is optionally pressurized by a turbocharger compressor 65, a separate pump compressor or manifold pressure. Preferably, the entry air pressure from the port at valve 115 is approximately 1-20 bar and the diesel fuel pressure from injector 103 is approximately 100-3,000 bar, both of which may be real-time and automatically varied by the controller. A piston compression ratio of at least 12:1 is expected. Less preferably, the intake air can alternately be at atmospheric pressure.

Diesel engine 11, illustrated in FIG. 1, optionally includes a turbocharger compressor 65 which is driven by a shaft, gears or the like coupled to turbocharger compressor 67 which, in turn, is driven by exiting exhaust gas 201. Compressor 65 delivers both fresh air 203 and cooled EGR 205 to main combustion chamber 43. The cooled EGR will enter an inlet port of the compressor from an exhaust port upstream of the turbine, so it is at a high enough pressure to overcome the compressor's output pressure. A small fraction of the high pressure air exiting the compressor 65 is diverted to a second compression area through inlet passageway 151, which is further compressed by purge pump 111 to ensure that the incoming air pressure in pre-chamber 41 is greater than the total pressure in combustion chamber 43 during piston compression. In the present exemplary diesel configuration, the pre-ignition air pressure in the pre-chamber is approximately 15 bar. If the optional turbocharger is employed to pressurize the pre-chamber, then the purge pump 111 arrangement may not be required.

The turbocharger feature advantageously permits cooled EGR to enter the intake system with the atmospheric fresh air charge for the primary combustion chamber and thereby reduces back pressure on the turbine. It is noteworthy that the majority of the EGR used from a previous cycle enters main compression chamber 43 and less than 25% of the EGR enters pre-chamber 41. The controller may automatically vary the quantity and/or pressure of the EGR entering each chamber in real time. Furthermore, electronic control unit 95 may calculate the optimum amount of EGR to be introduced into the pre-chamber and/or main combustion chamber, depending upon the engine temperature, diesel fuel quantity per cycle, fresh air temperature and the like in order to vary the ignition delay and/or timing in the pre-chamber and/or main chamber to reduce diesel fuel consumption, deter auto-ignition, and/or to reduce exhaust particulate emissions and NOx. The turbocharger and/or purge pump boosted air supply directly into pre-chamber 41 can be performed in a diluted manner with the EGR or in a pure and undiluted manner with only fresh air.

Alternately, hot EGR can be provided to combustion chamber 43. Controller 95 can cause hot EGR to remain in the combustion chamber 43 by controlling the associated exhaust cam shaft phaser. Boosting the air intake into the pre-chamber allows the system to maintain control of the combustion rates even at high levels of main chamber EGR. Moreover, it is envisioned that if there is a stoichiometric, low EGR region in the pre-chamber, the diesel fuel-air charge in the pre-chamber would auto-ignite and then subsequently ignite the main combustion chamber charge, which may be intentionally desired in some engine operating conditions.

Figure 4:
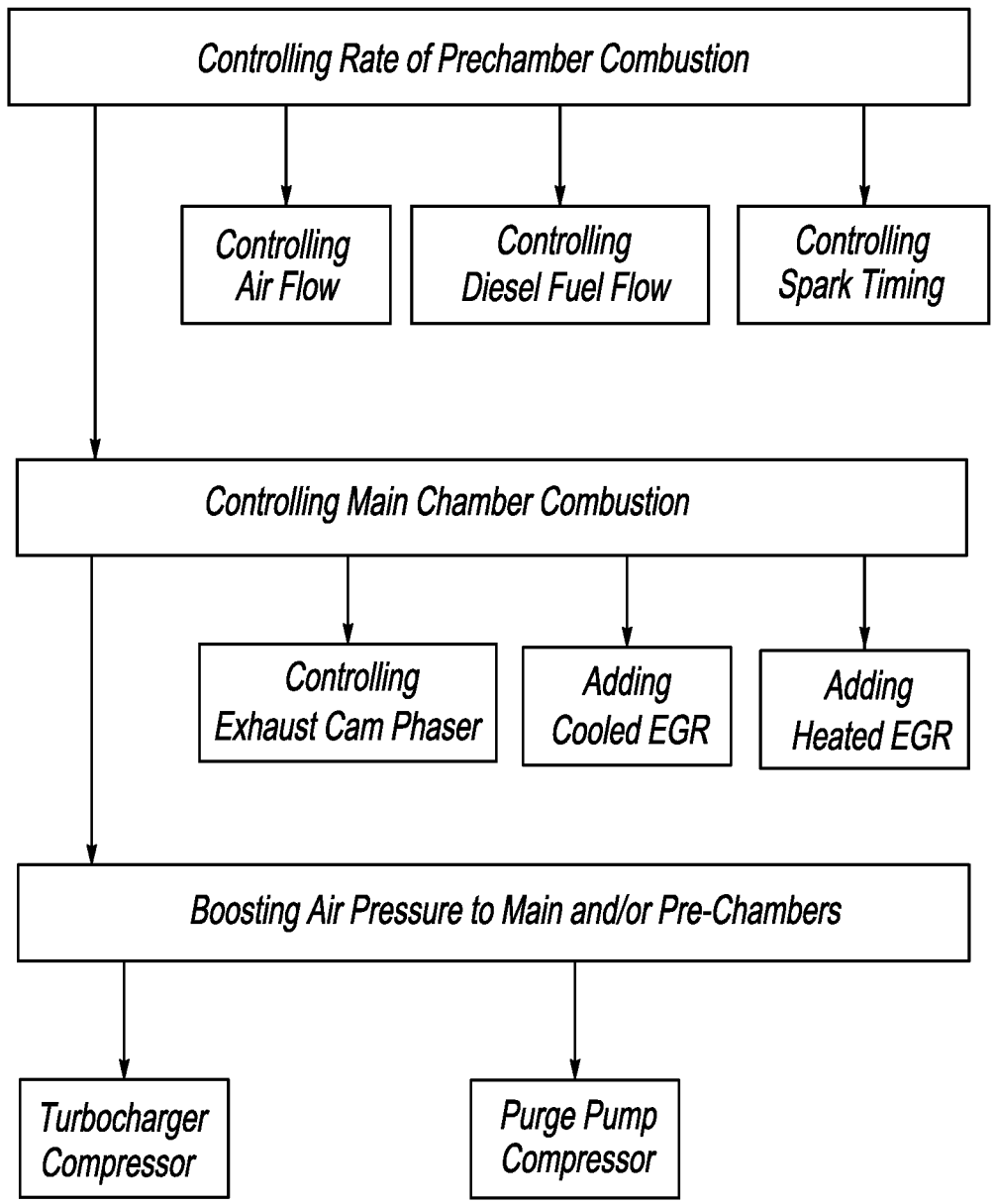
FIG. 4 is a functional block diagram showing computer software control of the present diesel engine with turbulent jet ignition.

A method of operating a diesel engine with turbulent jet ignition will now be described with reference to FIGS. 1, 3 and 4. Diesel fuel is injected into the pre-chamber, the recirculated exhaust gas is optionally injected into the pre-chamber and/or main combustion chamber, a compressor boosts or pressurizes fresh air into the pre-chamber, and either the ignition plug or less preferably, auto-ignition, ignites the diesel fuel, air and optional exhaust gas mixture within the pre-chamber. The ignited pre-chamber mixture transmits through at least one and preferably multiple apertures from the pre-chamber into the separate main combustion chamber which linearly advances a piston. The piston then rotates a crank shaft at a speed of at least 6,000 rpm in an exemplary embodiment of the present system. Electronic controller 95 optimizes combustion in the main combustion chamber by optionally allowing EGR entry by controlling an EGR inlet valve and/or through cam phasers. The controller further can optionally control combustion within the pre-chamber by regulating the timing, quantity and/or pressure of air and/or EGR entering the pre-chamber. Moreover, the electronic controller may optionally vary a spark ignition timing within the pre-chamber.

Figure 5:
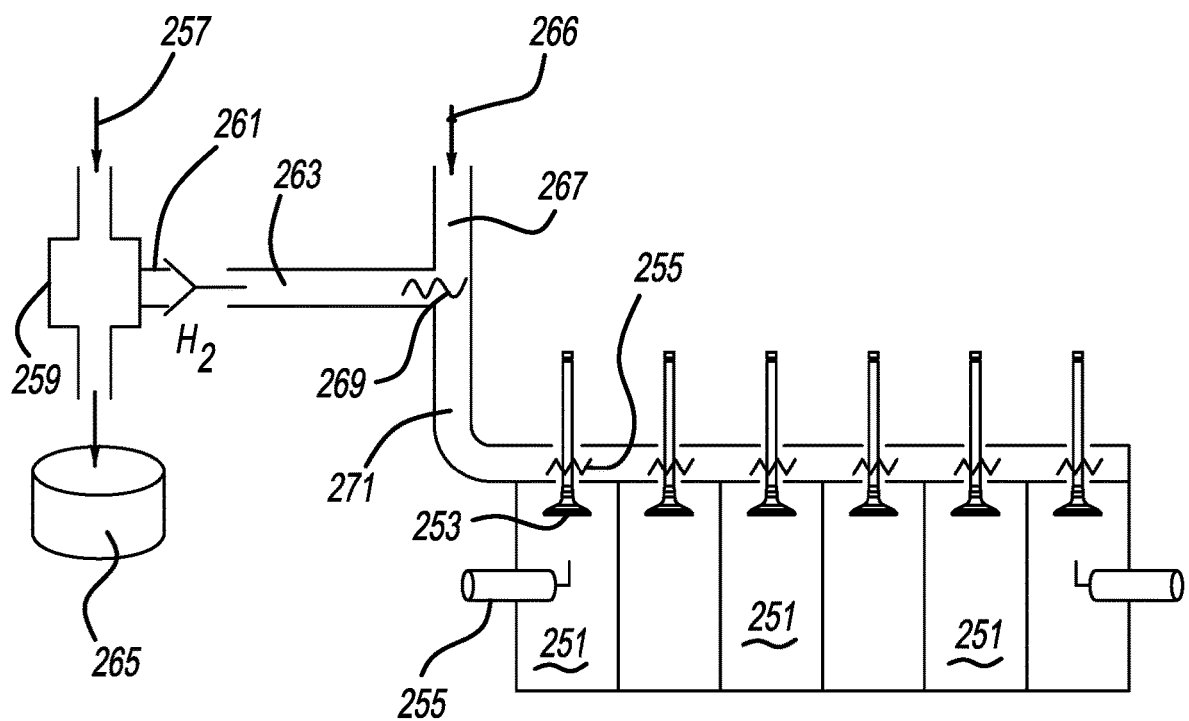
FIG. 5 is a diagrammatic view showing an alternate embodiment of the present diesel engine with turbulent jet ignition.

Reference should now be made to FIG. 5 which illustrates an alternate embodiment of a diesel engine with turbulent jet ignition system. A set of pre-chambers 251 each contain one or more apertures (such as 55 in FIG. 2) aligned with a main piston combustion chamber (such as 43 in FIG. 1). A linearly moveable poppet valve 253 and screen-type flame arrestor 255 are associated with each pre-chamber 251. Diesel fuel 257 enters a fuel cell reformer 259 which contains a catalyst to split hydrogen from the diesel fuel. Less than 3% and greater than 0% of the diesel fuel (or other hydrocarbon) becomes hydrogen 261 or a desirable reformed hydrocarbon, $H_xC_y$, which is pumped into a fuel line 263, with the remainder of the diesel fuel 257 being transmitted into a storage tank 265. Fresh and/or EGR air 266 is allowed to enter an air conduit 267 and mixing of the air and hydrogen occurs at a junction 269 of the air conduit and fuel line. This pre-mixed fuel is subsequently transmitted through a passageway 271 to each pre-chamber 251 through an entry port associated with each valve 253. A spark ignitor 255 subsequently ignites the pre-mixed charge within each pre-chamber which subsequently combusts within the main piston chamber. It is alternately envisioned that a fuel injector can be employed instead of a manifold, and that a pump, EGR turbocharger, or other such compressor can be used for pressurizing the intake air.

While various features of the present invention have been disclosed, it should be appreciated that other variations may be employed. For example, the present engine structure or operational method may be employed in an airplane engine for rotating a propeller, although various advantages of the present system may not be realized. Any of the embodiments disclosed in commonly owned U.S. Patent Publication No. 2016/0230645 entitled "Internal Combustion Engine" which published to Schock et al. on Aug. 11, 2016, may be employed with the present diesel engine system and method; this patent application is incorporated by reference herein. Additionally, alternate diesel fuel-air passageways, conduits, and ports may be provided, although some advantages may not be achieved. Additionally, it is envisioned that different types of valves, sensors and actuators may be used, but certain benefits may not be achieved. Alternately, variations in the diesel fuel-air mixture can be used, but performance may suffer. Each and all of the above-disclosed and hereinafter claimed engine components and method steps can be combined or re-ordered in any combination. Variations are not to be regarded as a departure from the present disclosure, and all such modifications are intended to be included within the scope and spirit of the present invention.

The invention claimed is:
1. A diesel engine system comprising:
a diesel fuel inlet;
an aft inlet;
a pre-chamber adapted to receive, mix and ignite diesel fuel from the diesel fuel inlet and air from the air inlet;
a main piston combustion chamber connected to the pre-chamber via always open, multiple passageways therebetween;
pressure of the air in the pre-chamber being greater than a pressure in the r rain chamber for purging, prior to ignition in the pre-chamber;
a programmable controller operably controlling at least one characteristic associated with entry, mixing or combustion of the diesel fuel and air in the pre-chamber;
the programmable controller including software instructions which control an amount of the diesel fuel, the air which includes fresh air, and exhaust gas recirculation allowed into the pre-chamber;
the programmable controller operably reducing or eliminating auto-ignition during piston compression by controlling the amount and a temperature of the exhaust gas recirculation to both the main combustion chamber and the pre-chamber; and
the programmable controller operably allowing some but less than 25% of the exhaust gas recirculation to enter the pre-chamber while allowing a greater amount of the exhaust gas recirculation to enter the main combustion chamber.

2. The system of claim 1, further comprising an ignitor operably igniting the diesel fuel and the air in the pressurized pre-chamber.

3. The system of claim 2, wherein:
the ignitor is one of: a spark plug or a glow plug, having an igniting end located in the pre-chamber; and
the programmable controller automatically varies pre-chamber pressure, diesel fuel quantity and ignition timing using the ignitor.

4. The system of claim 1, wherein:
the programmable controller includes programmed instructions adapted to receive a signal indicative of sensed pressure in the pre-chamber and a signal indicative of sensed pressure in the main combustion chamber;
the controller automatically adjusting the pressure in the pre-chamber; and
the controller causing the diesel fuel and the air to be emitted into the pre-chamber.

5. The system of claim 1, wherein:
the pre-chamber has a constant volume and there are multiple spaced apart apertures connecting the pre-chamber to the main combustion chamber, a turbulent jet of the ignited diesel fuel and the air is ejected through the apertures to act upon a piston head surface in the main combustion chamber; and
the programmable controller is configured to automatically calculate an optimum amount of exhaust gas recirculation to be introduced into at least one of the chambers, and the programmable controller is configured to then vary a quantity and/or pressure of the exhaust gas recirculation entering the pre-chamber and the main combustion chamber.

6. The system of claim 1, wherein the fresh air is pumped into the pre-chamber to purge prior combustion products, and the diesel fuel and the air are pressurized and separately admitted into the pre-chamber; and further comprising a turbocharger causing the exhaust gas recirculation to enter an inlet valve with the fresh air to the main combustion chamber to reduce back pressure on a turbine in the turbocharger.

7. A diesel engine system comprising:
a diesel fuel inlet;
an air inlet;
a pre-chamber adapted to receive, mix and ignite diesel fuel from the diesel fuel inlet and air from the air inlet;
a main piston combustion chamber connected to the pre-chamber via always open, multiple passageways therebetween;
pressure of the air in the pre-chamber being greater than a pressure in the main chamber prior to ignition in either of the chambers;
a programmable controller operably controlling at least one characteristic associated with entry, mixing or combustion of the diesel fuel and air in the pre-chamber; and
a turbocharger compressor driven by exhaust gas exiting the main combustion chamber;
the turbocharger compressor delivering the air, which includes both fresh and cooled exhaust gas recirculation air, to the main combustion chamber; and
the programmable controller automatically calculating an optimum amount of exhaust gas recirculation to be introduced into at least one of the chambers, and the programmable controller then varying a quantity and/or pressure of the exhaust gas recirculation entering the pre-chamber and the main combustion chamber.

8. A method of operating a diesel engine comprising:
(a) injecting diesel or hydrogen fuel into a pre-chamber;
(b) flowing exhaust gas into the pre-chamber;
(c) compressing fresh air into the pre-chamber;
(d) igniting a mixture of the fuel, fresh air and exhaust gas within the pre-chamber;
(e) transmitting the ignited mixture through at least one aperture into a separate main combustion chamber;

(f) minimizing undesired auto-ignition of the mixture prior to steps (d) and (e);
(g) moving a piston due to combustion of the mixture in the main combustion chamber;
(h) using a programmable controller to control an amount of the fuel, the fresh air, and the exhaust gas allowed into the pre-chamber; and
(i) rotating a cam shaft at a speed of at least 6,000 rpm.

9. The method of claim 8, further comprising:
using a turbocharger to compress the fresh air into the pre-chamber; and
using the programmable controller to automatically control at least three of:
(a) a rate of pre-chamber combustion of the diesel fuel;
(b) a flow of the diesel fuel into the pre-chamber;
(c) a temperature of the exhaust gas to the pre-chamber;
(d) an amount of the exhaust gas to the pre-chamber; and
(e) a mixing ratio of the air and the diesel fuel in the pre-chamber.

10. The method of claim 8, further comprising:
reducing the undesired auto-ignition during piston compression by controlling an amount and temperature of exhaust gas recirculation or residual gases to the main combustion chamber and the pre-chamber;
causing temperatures to be less than 1,500° C. within the diesel engine; and
moving a vehicle with the diesel engine.

11. The method of claim 8, further comprising causing a spark plug or a glow plug ignitor to perform the igniting of the fuel, which is diesel fuel, within the pre-chamber.

12. The method of claim 8, further comprising transmitting the fresh air from a turbocharger compressor to the pre-chamber.

13. The method of claim 8, further comprising causing incoming air pressure in the pre-chamber to be greater than a total pressure in the main combustion chamber during piston compression, the pre-ignition air pressure in the pre-chamber being at least 15 bar.

14. The method of claim 8, further comprising transmitting the exhaust gas to the main combustion chamber and to the pre-chamber, the amount being greater to the main combustion chamber than to the pre-chamber.

15. The method of claim 8, further comprising using the programmable electronic controller to calculate and automatically vary an amount of the exhaust gas to be introduced into the pre-chamber and the main combustion chamber.

16. The method of claim 8, further comprising:
(a) splitting the hydrogen fuel from the diesel fuel;
(b) mixing the air with the hydrogen;
(c) transmitting the air and the hydrogen into the pre-chamber.

17. A method of controlling combustion in both a pre-chamber and a main chamber, the method comprising:
(a) controlling a fuel-air ratio, ignition and timing in the pre-chamber to optimize a rate of combustion in the main chamber;
(b) controlling main chamber exhaust gas recirculation by regulating a cam phase, an exhaust gas recirculation valve position, and a turbocharger characteristic;
(c) controlling a closed-loop, main chamber rate of combustion through controlling a rate of the main chamber exhaust gas recirculation, an ignition-timing in the pre-chamber and the fuel-air ratio;
(d) using a turbocharger to compress fresh air into the pre-chamber; and
(e) using a programmable controller to automatically control an amount of the exhaust gas recirculation to both the pre-chamber and the main chamber;
(f) using a programmable controller to also automatically control at least two of:
(i) a rate of pre-chamber combustion of fuel which includes diesel fuel;
(ii) a flow of the diesel fuel into the pre-chamber;
(iii) a temperature of the exhaust gas recirculation to the pre-chamber; and
(iv) a mixing ratio of the air and the fuel in the pre-chamber.

18. The method of claim 17, further comprising:
igniting diesel fuel in the pre-chamber with a spark plug or a glow plug, having a first centerline axis through a pre-chamber end which is offset angled from a second centerline axis of a fresh air inlet valve having an pre-chamber end;
transmitting fresh air to purge the pre-chamber by a turbocharger compressor via the air inlet valve therebetween; and
transmitting the exhaust gas recirculation to the pre-chamber and the main chamber, with the amount being greater to the main chamber than to the pre-chamber.

19. The method of claim 17, further comprising using the programmable electronic controller to calculate and automatically vary an amount of the exhaust gas recirculation to be introduced into the pre-chamber and the main combustion chamber to reduce or eliminate auto-ignition during piston compression.

20. The method of claim 17, further comprising:
(a) splitting hydrogen fuel from diesel fuel;
(b) mixing air with the hydrogen fuel;
(c) transmitting the air and the hydrogen fuel into the pre-chamber.

21. The system of claim 1, further comprising:
an ignitor operably igniting the diesel fuel and the air in the pressurized pre-chamber; and
centerline axes of the ignitor, the diesel fuel inlet and the air inlet being offset angled to each other and having ends located in the pre-chamber.

22. The system of claim 21, wherein:
the ignitor is one of: a spark plug or a glow plug, having an igniting end located in the pre-chamber at about the same longitudinal position as a diesel fuel inlet spaced below a valve of the air inlet; and
the programmable controller automatically varies pre-chamber pressure, diesel fuel quantity and ignition timing using the ignitor.

23. The system of claim 7, wherein:
the programmable controller includes programmed instructions adapted to receive a signal indicative of sensed pressure in the pre-chamber and a signal indicative of sensed pressure in the main combustion chamber;
the controller automatically adjusting the pressure in the pre-chamber;
the controller causing the diesel fuel and the air to be emitted into the pre-chamber; and
the controller varying an ignition delay and/or timing in at least one of the chambers to deter auto-ignition.

24. The system of claim 7, wherein the programmable controller includes software instructions which control an amount of the diesel fuel, the air which includes fresh air, and exhaust gas recirculation allowed into the pre-chamber.

25. The system of claim 7, wherein the pre-chamber has a constant volume and there are multiple spaced apart apertures connecting the pre-chamber to the main combustion chamber, a turbulent jet of the ignited diesel fuel and the air is ejected through the apertures to act upon a piston head surface in the main combustion chamber.

26. The system of claim 7, wherein the air which includes fresh air is pumped into the pre-chamber to purge prior combustion products, and the diesel fuel and the air are pressurized and separately admitted into the pre-chamber.

27. The system of claim 7, wherein the turbocharger compressor delivers the air, which includes both fresh and cooled exhaust gas recirculation air, to both the main combustion chamber and the pre-chamber.

\* \* \* \* \*